(12) United States Patent
Nishihara et al.

(10) Patent No.: US 9,736,076 B2
(45) Date of Patent: Aug. 15, 2017

(54) DEVICE SERVER AND CONTROL METHOD THEREOF

(71) Applicant: Silex Technology, Inc., Kyoto (JP)

(72) Inventors: Kenta Nishihara, Kyoto (JP);
Kazutoshi Takata, Kyoto (JP);
Masakazu Tatsumi, Kyoto (JP)

(73) Assignee: Silex Technology, Inc., Kyoto (JP)

( * ) Notice: Subject to any disclaimer, the term of this patent is extended or adjusted under 35 U.S.C. 154(b) by 233 days.

(21) Appl. No.: 14/611,403

(22) Filed: Feb. 2, 2015

(65) Prior Publication Data
US 2015/0229570 A1    Aug. 13, 2015

(30) Foreign Application Priority Data
Feb. 10, 2014    (JP) ................................. 2014-023336

(51) Int. Cl.
H04L 12/815    (2013.01)
G06F 13/40     (2006.01)

(52) U.S. Cl.
CPC ........ *H04L 47/225* (2013.01); *G06F 13/4045* (2013.01)

(58) Field of Classification Search
None
See application file for complete search history.

(56) References Cited

U.S. PATENT DOCUMENTS

| | | | | |
|---|---|---|---|---|
| 5,708,779 A | * | 1/1998 | Graziano | G06F 13/128 709/250 |
| 5,758,075 A | * | 5/1998 | Graziano | G06F 13/128 370/463 |
| 6,745,264 B1 | * | 6/2004 | Luke | G06F 13/385 710/100 |

(Continued)

FOREIGN PATENT DOCUMENTS

| | | |
|---|---|---|
| JP | 2000-261466 A | 9/2000 |
| JP | 2006-072435 A | 3/2006 |

(Continued)

OTHER PUBLICATIONS

"SX-3000GB", retrieved from <<4) http://www.silexamerica.com/products/connectivity-solutions/device-networking/usb-parallel-connectivity/sx-3000gb/>>, 1 page, no later than Feb. 8, 2015.

*Primary Examiner* — Ninos Donabed
(74) *Attorney, Agent, or Firm* — Ogilvie Law Firm

(57) ABSTRACT

A configuration in which a device server is connected to a client and is also locally connected to a USB device suppresses data transfer volume fluctuation due to network delay, maintains the data transferring volume at a value guaranteed by the isochronous output transfer and improves network robustness under the isochronous output transfer process. The device server includes a data buffer portion for the isochronous output transfer data and performs advance reading of the isochronous output transfer data after sending back a transfer completion response unconditionally to the client upon receiving an isochronous output transfer request (Continued)

from the client. When the retention data volume in the data buffer portion reaches the upper limit threshold, the transfer data buffered in the data buffer portion is transferred to the device over the isochronous output transfer.

13 Claims, 7 Drawing Sheets

(56) References Cited

U.S. PATENT DOCUMENTS

| | | | | |
|---|---|---|---|---|
| 7,006,133 | B1* | 2/2006 | Hayashi | H04N 5/232 348/207.1 |
| 7,505,455 | B1* | 3/2009 | Goodwin | H04L 12/40052 370/356 |
| 8,335,875 | B1* | 12/2012 | Thakur | H04W 52/0209 709/233 |
| 8,694,671 | B2* | 4/2014 | Miyoshi | G11B 20/10 360/48 |
| 8,949,815 | B2 | 2/2015 | Phaedrus et al. | |
| 2003/0236932 | A1* | 12/2003 | Saito | G06F 13/4286 710/52 |
| 2004/0153595 | A1* | 8/2004 | Sukegawa | G06K 19/077 710/305 |
| 2006/0123181 | A1* | 6/2006 | Aull | H04L 47/10 710/310 |
| 2008/0010383 | A1* | 1/2008 | Miyoshi | G11B 20/10 709/231 |
| 2010/0150180 | A1* | 6/2010 | Arambepola | H04L 47/14 370/503 |
| 2010/0153600 | A1* | 6/2010 | Sthoeger | G06F 13/385 710/110 |
| 2010/0198999 | A1* | 8/2010 | Nair | G06F 13/387 710/33 |
| 2010/0293435 | A1* | 11/2010 | Chang | H03M 13/6306 714/758 |
| 2011/0047303 | A1* | 2/2011 | Saito | G06F 3/061 710/39 |
| 2011/0271016 | A1* | 11/2011 | Hsiao | G06F 13/426 710/52 |
| 2012/0014372 | A1* | 1/2012 | Arambepola | H04L 47/14 370/350 |
| 2012/0030677 | A1* | 2/2012 | Panesar | G06F 9/4413 718/1 |
| 2013/0191570 | A1* | 7/2013 | Lee | H04N 21/43615 710/106 |

FOREIGN PATENT DOCUMENTS

| | | |
|---|---|---|
| JP | 2006-217476 A | 8/2006 |
| JP | 2006-254290 A | 9/2006 |
| JP | 2007-088775 A | 4/2007 |
| JP | 2008-090847 A | 4/2008 |
| JP | 2008-287453 A | 11/2008 |
| JP | 2012-138694 A | 7/2012 |
| JP | 2012-204880 A | 10/2012 |
| WO | WO02/09110 A1 | 1/2002 |

* cited by examiner

DEVICE SERVER AND CONTROL METHOD THEREOF

TECHNICAL FIELD

The present invention relates to a device server and a control method thereof for performing the isochronous transfer between a client and a device (especially audio device) via a network.

BACKGROUND ART

In recent years, an IP network such as a wired LAN (Local Area Network) or a wireless LAN is widespread more and more to become an infrastructure for daily life of people. Price reduction of a network I/F (interface) is also progressing.

Also, with regard to peripherals locally connected to a computer in the past, it has become possible to control peripherals via a computer and an IP network under the current circumstances in which an IP network speed has become high enough to be compatible with sending/receiving of control data.

Under such circumstances, a device server system that enables a USB (Universal Serial Bus) device, i.e. a computer peripheral to be operated through an IP network by a computer connected to said IP network is known. (Refer to Patent Literature 1, Non-Patent Literature 1)

In the device server system, a USB data such as a control command issued by a USB device driver of a client is converted to an IP packet form (encapsulation), and this IP packet is transferred to a device server from the client. The device server that receives the IP packet retrieves a USB data such as a control command contained in the received IP packet (de-capsulation) and transfers to a USB device connected locally to the device server itself after converting the USB data into the one in USB communication mode.

Communication between the device server and the USB device is in accordance with the USB standard for communication. For example, in a case of communication from the client to the USB device, the device data is transferred from the client to the USB device via the device server and at the same time the client receives response regarding the USB device status whenever necessary via the device server.

When the USB device is a speaker, the client transfers streaming data such as sound which requires being real time to the USB device. In such a case, by performing the data transfer by the isochronous method (isochronous transfer) that ensures a minimum data transfer volume per a definite period of time, the data can be transferred without a pause.

When the isochronous transfer is performed between a client and a USB device via a device server, the client and the USB device is not locally connected but connected via a network, which leads to elevated network traffic and consequently the data transfer speed among network segments is degraded. Even if that is the case, it is necessary to maintain the minimum data transfer volume that should be guaranteed by the isochronous transfer.

A control method of a device server, in the course of internal processing of the device server, that transfers response information from a USB device to a device driver of the client, in a mode of a dummy response to the isochronous transfer request is known.
(Patent Literature 2)

According to the control method disclosed in Patent Literature 2, the client can maintain the minimum data transfer volume guaranteed by the isochronous output transfer because stagnation of the processing of the next isochronous transfer request due to the delay (waiting for reception) of response information from the USB device can be avoided.

However, according to the control method of the device server disclosed in Patent Literature 2, the device server transfers to the device driver of the client dummy response data disguised as response information from the USB device even when the device server does not receive response information from the USB device within a predetermined time, which leads to an undesirable situation in which the client sends out the next isochronous transfer request while the device server cannot receive this request and cannot deliver the request to the device when the network itself is in an unrecoverable status (fatal status).

PRIOR ART

Patent Literature

[Patent literature 1] JP2008-287453A
[Patent literature 2] JP4617440B

Non-Patent Literature http://www.silex.jp/products/usb/sx3000gb.html

OUTLINE OF THE INVENTION

Problems to be Solved by the Invention

Conventionally, a client avoids damages coming from a delay in a network by requesting the isochronous transfer in several hundred milliseconds before for an advance reading. In a device server, the isochronous transfer to a USB device is performed in response directly to the isochronous transfer request under a schedule given by the client.

However, especially for a wireless LAN case, the delay in the network cannot necessarily be recovered only by the advance reading by several hundred milliseconds, because wireless network transfer is stagnated due to link breaking and harmful effects of aggregation, depending on a radio wave status.

Once a link is restored after link breaking at a wireless LAN level, there could be a case in which a vast amount of data is transferred due to multiple isochronous transfer requests sent from the client at a time. In the conventional device server system, a phenomenon in which scheduling for the isochronous transfers cannot be performed may occur because the isochronous transfer to the USB device is performed based on isochronous transfer requests precisely as requested by the client. In this case, a response is transferred as a communication error against the USB standard (a stack level error: data flaw has occurred due to the lack of buffering space in a scheduler).

Because the client receives such response regarding the status of the USB device via the device server, the client cuts off the session with the device server and the isochronous transfer is terminated in spite of the fact that the error is not fatal in nature.

As has been explained thus far, the isochronous transfer by the conventional device server cannot avoid the effect of a data transfer volume fluctuation caused by the network delay and consequently, the data transfer volume that should be guaranteed by the isochronous transfer cannot be maintained because the isochronous transfer is carried out toward the USB device based on the isochronous transfer requests precisely as requested by the client. Namely, there is a problem that the network tolerance of the isochronous transfer system via the conventional device server is low.

In view of the situation mentioned above, some purposes of the present invention are to provide a device server locally connected to a device and a device server control method thereof that reduce or eliminate influences caused by a data transfer volume fluctuation due to a network delay, help maintain the data transfer volume to be guaranteed by the isochronous transfer, and improve the network robustness of the isochronous output transfer.

Means to Solve the Objects

For achieving the purpose mentioned above, the present invention is characterized by a device server, connected to a client via a network and also locally connected to devices for performing the isochronous transfer, and equipped with a data buffer portion for buffering transferred data requested upon receiving the isochronous output transfer request from the client.

Upon receiving the isochronous output transfer request from the client, the device server immediately and unconditionally sends back a transfer completion response to the client and conducts the advance reading of the isochronous output transfer data. And the device server accumulates the transfer data received in the data buffer portion and holds the action of the isochronous output transfer to the device.

When the retention data volume at the data buffer portion reaches an upper limit threshold, the isochronous output transfer of the transfer data buffered in the data buffer portion of the device server is started at a predetermined transfer rate.

Here, the client represents a general computer terminal such as a personal computer which is an equipment to be connected to a network and to conduct the isochronous output transfer to a device locally connected to the device server. And the device is equipment capable of data communication with the device server by a data communication method in accordance with the USB communication standard for example while being locally connected to the device server. The device server conducts the isochronous output transfer toward the device which is exemplified by an audio device such as a USB speaker.

Also, "receiving an isochronous output transfer request from the client" means that the device server receives an output transfer request including the isochronous output transfer data transmitted from the client. Further, "returning a transfer completion reply unconditionally" means that the device server returns a transfer completion reply immediately without waiting for the transfer success reply (OK), while the transfer completion response were to be returned to the client, in principle, after performing the isochronous output transfer to the USB device and subsequently receiving a transfer completion response (OK).

The device server, upon receiving the isochronous output transfer request from the client, maintains the data transfer volume to be guaranteed by the isochronous transfer by returning a transfer completion response to the client immediately and unconditionally, by conducting the advance reading of the isochronous output transfer data, by accumulating the transfer data received in data buffer portion and by starting the isochronous output transfer to the device after determining the retention data volume in the data buffer portion to be enough after accumulation of data buffering. Thus, stable data output to the device can be performed even when network environment becomes unstable, especially when the data transfer is stagnated due to broken links or to ill effects of aggregation, in such case as usage of a wireless LAN.

For example, when the device is a USB speaker, a stable sound output can be achieved by outputting a sound transfer data buffered in a data buffer portion toward the USB speaker even when a network environment becomes unstable in a wireless LAN and such, by setting up a data buffer portion in the device server.

The operation mode of the device mentioned above is altered according to cases (1) to (3) below.

(1) in a range starting from a state wherein the retention data volume of the data buffer portion reaches an upper limit threshold to a state wherein the retention data volume becomes lower than an intermediate threshold;

the isochronous output transfer to a device at a predetermined transfer rate is performed and when the isochronous output transfer is completed, if there is a request a response thereto is not sent back to the client, upon receiving an isochronous output transfer request from the client, a transfer completion response is sent back to the client and the transfer data received is accumulated in the data buffer portion;

(2) in a range starting from a state wherein the retention data volume of the data buffer portion is lower than the intermediate threshold to a state wherein the retention data volume reaches the upper limit threshold or reaches an lower limit threshold;

the isochronous output transfer to a device at a predetermined transfer rate is performed and unconditionally sending back a transfer completion response to the client upon receiving the isochronous output transfer request from the client and the transfer data received is accumulated in the data buffer portion;

(3) in a range starting from a state wherein the retention data volume of the data buffer portion reaches a lower limit threshold to a state wherein the retention data volume reaches the upper limit threshold;

starting from the client without performing the isochronous output transfer to the device and unconditionally sending back the transfer completion response to the client upon receiving the isochronous output transfer request from the client and the transfer data received is accumulated in the data buffer portion.

"in a range starting from a state wherein the retention data volume of the data buffer portion reaches the upper limit threshold to a state wherein the retention data volume becomes lower than the intermediate threshold" as described in (1) above means that after the retention data volume of the data buffer portion increases to a value higher than a predetermined intermediate value as a result of the advance reading of the isochronous output transfer data from the client and then decreases to a level lower than a predetermined intermediate value as a result that the device server performs the isochronous output transfer to the device.

Also, "in a range starting from a state wherein the retention data volume of the data buffer portion is lower than the intermediate threshold to a state wherein the retention data volume reaches the upper limit threshold" as described in (2) above means that the retention data volume in the data buffer portion starts with a value lower than the intermediate threshold and the retention data volume in the data buffer portion increases up to the predetermined upper limit threshold as a result of the advance reading of the isochronous output transfer data from the client. And "in a range starting from a state wherein the retention data volume of the data buffer portion is lower than the intermediate threshold to a state wherein the retention data volume reaches the lower limit threshold" as described in (2) above means that the retention data volume in the data buffer portion starts with a value lower than the intermediate threshold and the advance reading of the isochronous output transfer data is restarted, however, the retention data volume in the data buffer portion decreases to a predetermined lower limit threshold without the isochronous output transfer request from the client.

Further, "in a range starting from a state wherein the retention data volume of the data buffer portion reaches the lower limit threshold to a state wherein the retention data volume reaches the upper limit threshold" as described in (3) above means that the retention data volume of the data buffer portion starts with a value equal to a lower limit threshold and reaches again the predetermined upper limit threshold by the advance reading of the isochronous output transfer data from the client and at the same time withholding the isochronous output transfer to the device.

By determining the retention data volume at the data buffer portion and subsequently changing the method of operation according to the cases (1) to (3) above, it becomes possible to maintain the data transfer volume that should be guaranteed for the isochronous transfer.

Here, "to reach the upper limit threshold" means that the retention data volume equals or exceeds the upper limit threshold value. And to become lower than the intermediate threshold, means that the retention data volume equals or falls below the intermediate threshold. The buffer size of the data buffer portion must be secured to be larger than the upper limit threshold. Thus, the upper limit threshold is set preferably at a value multiplying the buffer size of the data buffer portion by a coefficient of less than 1.

Also, the intermediate threshold, being a value 10 to 90% of the upper limit threshold, can be set freely by a user depending on the network environment and the operation environment of the device. Usually, the intermediate threshold is set at the value 60 to 80% of the upper limit threshold. The intermediate threshold can be set at multi-levels, which allows fine operation alteration.

Further, the lower limit threshold is either zero (0) or a value smaller than the intermediate threshold. The lower limit threshold is a value for the empty data buffer portion and is preferably set at zero (0).

Also, for the device server, in a range for the state of the retention data volume in the data buffer portion to reach the upper limit threshold and then to drop down to become lower than the intermediate threshold, it is preferable to prevent data buffer overflow by delaying the timing for sending a transfer completion response to the client.

In order to prevent overflow of a data buffer on the device server side, the client side has a function to coordinate the transfer timing of the isochronous output transfer.

Also, the device being an audio device, in a range that the retention data volume of the data buffer portion in the device server starts from a state being lower than the intermediate threshold to reach a state being at the lower limit threshold and that the retention data volume of the data buffer portion becomes lower than the mute setting threshold, the isochronous output transfer to the device is performed after processing the audio data row which is a retention data remaining in the data buffer portion.

By this sequence, the output sound from the audio device can be faded out.

A phenomenon of sound jumping (big noise) occurs when the data buffer portion of the device server becomes vacant. This is due to large sound variation originating to an abrupt silent state during playback. Accordingly, a data processing is performed to avoid sound jumping when the retention data volume in the data buffer portion becomes lower than a predetermined threshold.

The output sound volume from the audio device can be reduced, for example, by the multiplication of an audio data row by a coefficient less than 1, such as 0.9, 0.8 and 0.7.

Next, a control method of the device server is described.

The control method of the device server of the present invention: being a control method of a device server locally connected to a device for the isochronous transfer: comprising a transfer request receiving step for the isochronous output transfer request from a client, a transfer data retention step for buffering requested transfer data and an output transfer step for performing the isochronous output transfer to the locally connected device at a predetermined transfer rate.

The transfer data retention step stores the transfer data received to the data buffer portion after sending back a transfer completion response unconditionally to the client upon receiving the isochronous output transfer request from the client.

And the output transfer step starts the isochronous output transfer of the transfer data buffered in the data buffer portion when the retention data volume in the data buffer portion reaches the upper limit threshold.

The device server control method changes processes according to cases from (1) to (3).

(1) in the range starting from a state wherein the retention data volume of the data buffer portion reaches the upper limit threshold to a state wherein the retention data volume becomes lower than the intermediate threshold:

the device server transfers a transfer completion response to the client upon receiving the isochronous output transfer request from the client and having a request the response thereto is not sent back to the client when the isochronous output transfer to the device is completed, at the transfer request receiving step;

the transfer data received is stored in the data buffer portion, at the transfer data retention step; and the isochronous output transfer to the device at a predetermined transfer rate is performed, at the output transfer step.

(2) in the range starting from a state wherein the retention data volume of the data buffer portion is lower than the intermediate threshold to a state wherein the retention data volume reaches the upper limit threshold or reaches the lower limit threshold:

the device server transfers a transfer completion response to the client unconditionally upon receiving the isochronous output transfer request from the client at the transfer request receiving step;

the transfer data received is stored in the data buffer portion at the transfer data retention step; and the isochronous output transfer to the device at a predetermined transfer rate is performed at the output transfer step.

(3) in the range starting from a state wherein the retention data volume of the data buffer portion reaches the lower limit threshold to a state wherein the retention data volume reaches the upper limit threshold;

the device server transfers a transfer completion response to the client unconditionally upon receiving the isochronous output transfer request from the client at the transfer request receiving step;

the transfer data received is stored in the data buffer portion at the transfer data retention step; and the isochronous output transfer to the device is not performed at the output transfer step.

For the control method of the device server, the upper limit threshold equals a value of the buffer size of the data buffer portion multiplied by a coefficient of less than one, the intermediate threshold equals the value 10~90% of the upper limit threshold and the lower limit threshold equals the value of 0 (zero) or a smaller value than said intermediate threshold.

It is preferable, for the device control method of the present invention, to further prepare a step to delay the timing for sending transfer completion response to the client, when the retention data volume of the data buffer portion increases to the upper limit threshold, and then decreases to the level lower than the intermediate threshold.

The additional preparation of the step mentioned above inhibits an overflow of the data buffer on the device server side by letting the client side to adjust to the transfer timing of the isochronous output transfer.

The control method: the device being an audio device; in such a case that in the range starting from the state wherein the retention data volume in the data buffer portion is lower than the intermediate threshold to the state wherein the retention data volume reaches the lower limit threshold and at the same time the retention data volume of said data buffer portion becomes lower than the mute setting threshold, the device server conducts the isochronous output transfer to the device after calculating the audio data row which represents retention data remaining in the data buffer portion, in the output transfer step, and subsequently let the output sound from the audio device fade out.

The client, being equipped with (A) to (D) means below, and being connected to the device server mentioned above through a network, performs the isochronous transfer to the device locally connected to the device server.

(A) means for receiving the isochronous output transfer data issued by the USB device driver and to deliver said isochronous output transfer data, after converting into an IP packet, to the network transmission control driver;

(B) means for generating a transfer data storage buffer;

(C) means for storing the isochronous output transfer data in a transfer data storage for a case in which the isochronous output transfer data cannot be transferred to the network transmission control driver at a predetermined transfer rate, and (D) means for delivering the transfer data stored in the transfer data storage buffer to the network transmission control driver when the delivery of the isochronous output transfer data to the network transmission control driver becomes possible.

The client improves the network robustness of the isochronous output transfer because the transfer data can be buffered in the transfer data buffer on the client side even when the isochronous output transfer request from the client is stagnated due to the network environment instability based on the occurrence of data transfer stagnation originating to broken links or to ill effects of aggregation, in a wireless LAN and so on.

And the device server control program is a program for performing the isochronous transfer to a device locally connected to the device server mentioned above via a network, and also a program built in the client for a computer to function as means for (a) to (d) below:

(a) means for receiving the isochronous output transfer data issued by the USB device drive and to transform said isochronous output transfer data to an IP packet form and delivering said isochronous output transfer data, to the network transmission control driver;

(b) means for generating a transfer data storage buffer;

(c) means for accumulating the isochronous output transfer data in a transfer data storage buffer in such a case that the isochronous output transfer data cannot be delivered to the network transmission control driver at a predetermined transfer rate; and (d) means for delivering the transfer data stored in the transfer data storage buffer to the network transmission control driver when the delivery of the isochronous output transfer data becomes possible.

The device server control program to be installed in the client improves the network robustness of the isochronous output transfer, by setting up buffers both to the client and to the device server, because the transfer data can be buffered in the transfer data buffer on the client side even when the isochronous output transfer request from the client is stagnated due to the network environment instability caused by a data transfer stagnation originating either to broken links or to ill effects of aggregation in a wireless LAN and so on.

The effectiveness of the present invention is explained as follows using an example in which the device is a USB speaker, the client stores the sound transfer data in the transfer data storage buffer and the device server outputs the sound transfer data buffered in the data buffering portion until the network environment recovers even when the network environment becomes unstable for use of a wireless LAN and so on by setting up buffers both on the client and the device server. And the client transfers the sound transfer data stored in the transfer data storage buffer to the device server in batch and the device server buffers the sound transfer data received in the data buffer portion and output the sound transfer data to the USB speaker at a predetermined transfer rate, after the network environment has been restored.

Effects of the Invention

The present invention suppresses the influence of a data transfer volume fluctuation originating from a delay of the network, maintains the data transfer volume at an intensity guaranteed by the isochronous transfer and improves a network robustness in the isochronous output transferring, in the isochronous output transferring process of the device server with a device locally connected thereto.

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

Embodiment 1

Figure 1:
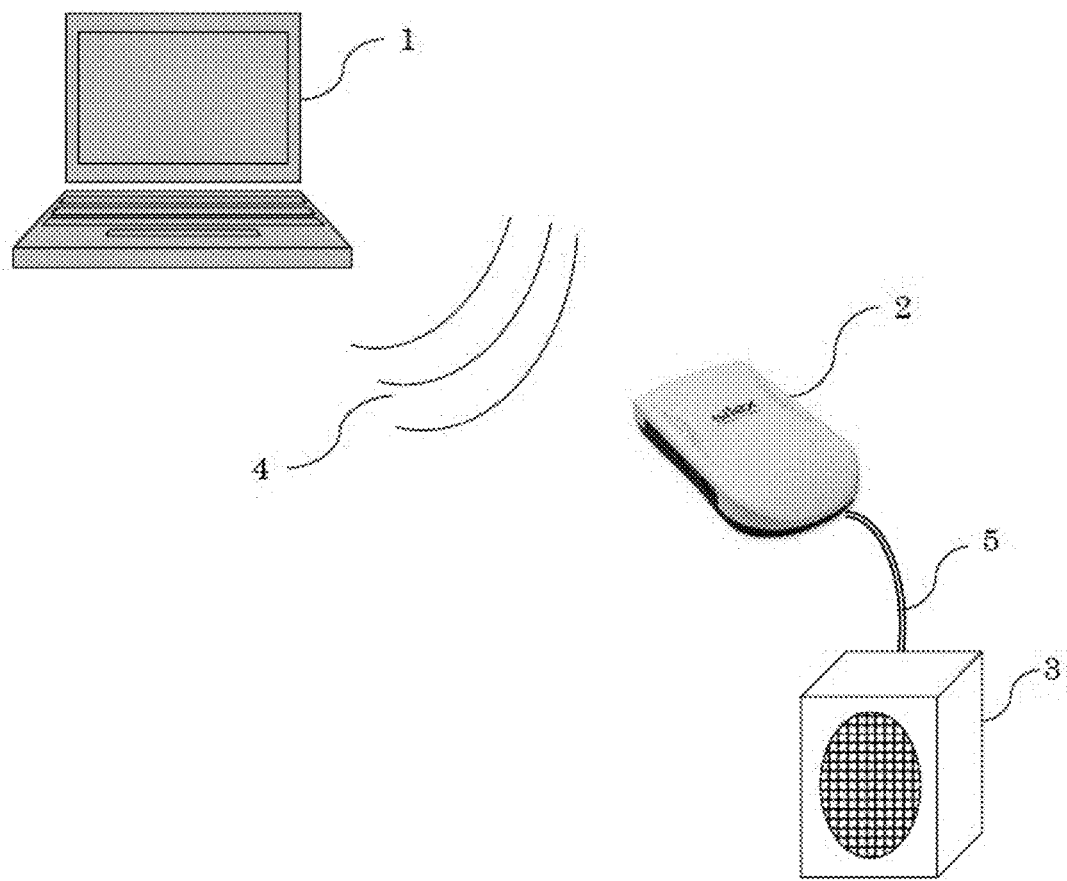
FIG. 1 A conceptual diagram of a device server system according to embodiment 1

FIG. 1 shows a conceptual diagram indicating a device server system according to embodiment 1. The client 1 and the device server 2 are connected via a wireless network and further, and the speaker 3, as an audio device, is locally connected to the device server 2 via a USB connection cable.

When the client 1 reproduces a music data file, the music data file is transferred to the device server 2 via the wireless network by the isochronous output transfer. The device server 2 retains the transfer data (music data) in the data buffer internally contained (not illustrated in the diagram) in the device server 2 and outputs the transfer data (music data) by the isochronous transfer to the speaker 3 after determining the retention data volume in the buffer.

In this system, the audio data (music data and voice data and so on) is transferred as a streaming data from an audio player loaded in the client 1 to the speaker 3 via the network. By the procedure mentioned here, the audio data is transferred to the speaker 3 without interruption by the isochronous output transfer that guarantees minimum data transfer volume per a fixed time.

Figure 2:
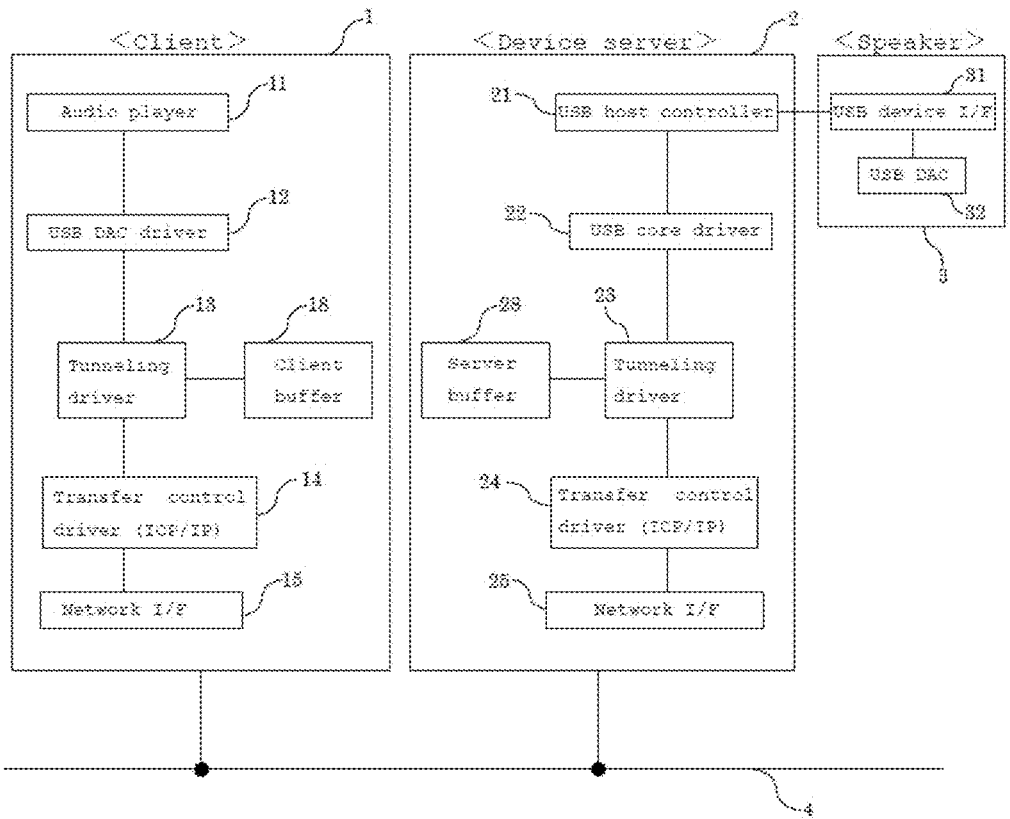
FIG. 2 A function block diagram of a device server system according to embodiment 1

FIG. 2 shows one example of a function block in the device server system.

In the device server system shown in FIG. 2, the transfer data (the music data) is output by the isochronous transfer via the network 4 from the client 1 to the speaker 3 which is a USB device locally connected to the device server 2.

Here, the network 4 is a wired or wireless network. Although the client 1 and the device server 2 in FIG. 2 are connected by one to one ratio, the number of the client 1 and the device server 2 can be multiple numbers such as N:1, 1:N, N:M (N and M are natural numbers larger than 2). The wireless network between the client 1 and the device server 2 can be either an ad hoc connection or an infrastructure connection via wireless access points. Also, the number of the USB devices locally connected to the device server can be more than 2, but only 1 client is allowed to communicate with a device at a time under the USB standard.

Here, the client 1 consists of a hardware configuration similar to that of a common personal computer, where a CPU, an input portion, a display portion, a memory and an external memory parts (those are not illustrated) as well as a network I/F (illustrated) and so on are connected via an internal bus.

In the client 1, there exist, as a software parts, the audio player 11, the USB driver 12 and the tunneling driver 13 stored in a memory part (not illustrated), being one of the applications to be loaded in a memory at the time of operation. Moreover, an OS (Operating System; not illustrated), a resident module to be started simultaneously with the OS and kept operational (not illustrated), and the transmission control driver (ICP/IP) 14 are stored in a storage part of the client 1 along with various kinds of data necessary for a control. These software parts and various kinds of data are read on the memory under the control of the CPU and various kinds of controls are executed.

And the speaker 3 being a USB device is locally connected to the device server 2 via a USB connection cable.

The device server 2, when the speaker 3 is connected thereto, receives the USB device information for recognizing and discerning the speaker 3. The device server 2 generates the USB core driver 22 necessary for transceiving data with the speaker 3 based on USB device information received and makes the speaker 3 to be controlled by the device server 2.

And the device server 2 transfers the USB device information received, to the client 1.

On the other hand, the speaker 3, being a USB device, comprises the USB device I/F 31 and the USB DAC 32, and the audio data is transferred between the USB DAC driver 12 of the client 1 and the USB DAC 32 of the speaker 3. This configuration enables transfer of audio data between the audio player 11 on the client 1 and the speaker 3 and music is reproduced from the speaker 3 based on the audio data.

The USB DAC driver 12 of the client 1 transforms an audio data output request (an isochronous output transfer request) from the audio player 11 to a packet data conformable into the USB data format after conversion of the audio data into the data format conformable to USB DAC 32 and delivers to the tunneling driver 13. Also, the USB DAC driver 12 transforms the packet data conformable to the USB data format sent out from the tunneling driver 13 into a predetermined data form and delivers to the audio player 11.

The tunneling driver 13 encapsulates the packet data delivered from the USB DAC driver 12 into an IP packet form. On the other hand, the tunneling driver 13 picks out the response packet data from the IP formed packet (de-capsulation) upon receiving the IP formed packet from the device server and delivers to the USB DAC driver 12.

Also, the tunneling driver 13 secures a buffer area (client buffer 18) on the memory of the client 1. The packet data delivered from the USB DAC driver 12 can be buffered by utilizing the buffer area as a transfer data storage buffer when the network environment becomes unstable, especially when the data transfer is stagnated due to broken link or to ill effect of aggregation in a wireless LAN. Thus, data loss is prevented even under a situation where the isochronous output transfer request is stagnated, resultantly the network robustness for the isochronous output transfer is improved.

On the other hand, the device server is equipped with the USB host controller 21, the USB core driver 22, the tunneling driver 23, the transmission control driver (ICP/IP) 24 and the network I/F 25.

The tunneling driver 23, upon receiving the IP packet from the client 1 via the network 4, extracts the packet data conformable to the USB data format from said IP packet (de-capsulation) and sends the extracted packet data to the USB core driver 22.

Also, the tunneling driver 23 receives the packet data conformable to the USB data format from the USB core driver 22 and encapsulates the packet data into the IP packet. Further, the tunneling driver 23 secures a buffer region (a server buffer 28) in the memory of the device server 2. Securement of the server buffer 28 corresponding to the data buffer portion enables the advance reading of the isochronous output transfer data and the transfer data received can be stored in the data buffer portion. The data transfer volume to be guaranteed for the isochronous transfer in transferring to USB devices can be maintained by starting the isochronous output transfer to the USB device after confirming the retention data volume to be large enough by the determination of the retention data volume in the data buffer portion even when the isochronous output transfer request from the client is stagnated due to instability of the network environment.

Further, the speaker 3 as a USB device is equipped with the USB DAC 32, the USB device I/F 31, USB gadget driver (not illustrated) and the sound reproduction application. The device server 2 performs the isochronous transfer of audio data to the speaker 3 at a predetermined transfer rate. This configuration enables stable transfer of the audio data between the USB DAC driver 12 in the client 1 and the USB DAC 32 in the speaker 3 and the audio data can be reproduced from the speaker 3.

Figure 3:
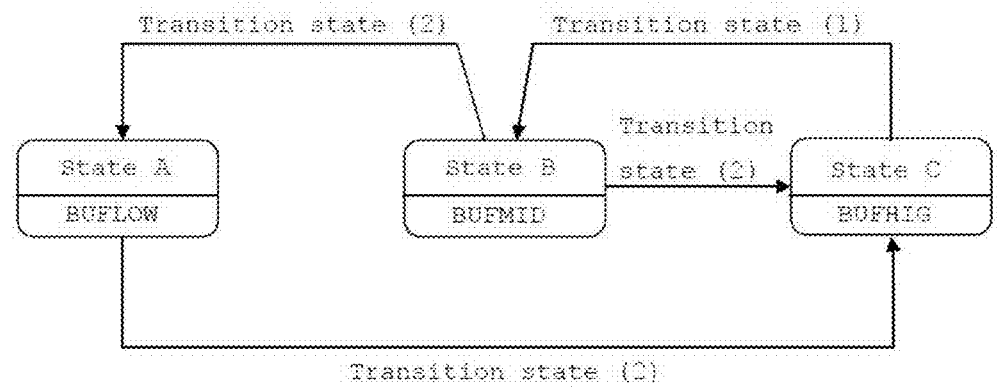
FIG. 3 A state change diagram of a device server according to embodiment 1

The device server 2 according to Embodiment 1 has 3 states (Modes) and the operation alters depending on the states. FIG. 3 shows a state transition diagram of the device server 2 according to Embodiment 1. With regard to the State A~the State C, there are differences as shown in Table 1.

TABLE 1

| Mode | Explanation |
| --- | --- |
| State A (BUFLOW) | State where buffer in device server has reached lower limit threshold |
| State B (BUFMID) | State where buffer in device server stays at medium threshold |
| State C (BUFHIG) | State where buffer in device server has reached upper limit threshold |

The state A (BUFLOW) represents a state where the retention data volume of the server buffer 28 in the device server 2 has reached the lower limit threshold.
The state B (BUFMID) represents a state where the retention data volume of the server buffer 28 in the device server 2 stays at the medium threshold.
The state C (BUFHIG) represents a state where the retention data volume of the server buffer 28 in the device server 2 has reached the upper limit threshold.

Here, the condition for each state transition among the state A~the state C is as follows.

The initial state wherein the isochronous output transfer is started from the client 1 is the state A (BUFLOW). After that, when the retention data volume of the server buffer 28 increases to reach the upper limit threshold with receiving the isochronous output transfer request, a transition from the state A (BUFLOW) to the state C (BUFHIG) occurs. For example, if the buffer size of the sever buffer 28 is 100, the upper limit threshold would be 90. (This transition from the state A to the state C is called "case (3)" for the following.)

Next, after the transition to the state C (BUFHIG), a transition from the state C (BUFHIG) to the state B (BUFMID) occurs when the retention data volume of the sever buffer 28 decreases to become lower than the medium threshold, 80% of the upper limit threshold, as a result of the output volume of the detention data from the buffer to the device side being larger than the volume required by the isochronous output transfer request from the client 1. (This transition from the state C to the state B is called "case (1)" for the following.)

After the transition to the state B (BUFMID), a transition from the state B (BUFMID) to the state C (BUHHIG) occurs when the retention data volume of the server buffer 28 increases once more to reach the upper limit threshold, as a result of the volume required by the isochronous output transfer being larger than the output volume from the buffer to the device side.

On the other hand, after the transition to the state B, a transition from the state B (BUFMID) to the state A (BUFLOW) occurs when the retention data volume of the sever buffer 28 becomes vacant, that is to say 0 (zero) (the lower limit threshold is set at 0 in this case), as a result of the output volume from the buffer to the device side being larger than the output volume required by the isochronous output transfer request. (The transitions, from the state B to the state C and from the state B to the state A are collectively called "case (2)" for the following.)

Next, an operation flow of buffering in the device server 2 according to Embodiment 1 is explained.

The operation of buffering is altered depending on the cases from (1) to (3) mentioned above.

(1): in the range starting from a state wherein in the retention data volume in the server buffer 28 reaches the upper limit threshold (the state C) to a state wherein the volume becomes lower than the intermediate threshold (80% of the upper limit threshold);

The isochronous output transfer to the speaker 3 at a predetermined transfer rate is performed and when an isochronous output transfer to the speaker 3 is completed, if there is a request a response thereto is not sent back to the client 1, upon receiving the isochronous output transfer request from the client 1, the transfer completion response is sent back to the client 1 and the transfer data received is accumulated in the sever buffer 28.

(2): in the range starting from a state wherein the retention data volume in the sever buffer 28 becomes lower than the intermediate threshold (80% of the upper limit threshold) (state B) to a state wherein the volume reaches the upper limit threshold (state C) or the volume becomes equal to the lower limit threshold 0 (zero) (the state A), the isochronous output transfer to the speaker 3 at a predetermined transfer rate is performed and, upon receiving the isochronous output transfer request from the client 1, a transfer completion response is sent back to the client 1 immediately and the transfer data received is accumulated in the sever buffer 28.

(3): in the range starting from the state that the retention data volume in the server buffer 28 becomes equal to the lower limit threshold 0 (zero) (state A) to the state that the volume reaches the upper limit threshold (state C), The isochronous output transfer to the speaker 3 is not performed and, upon receiving the isochronous output transfer request from the client 1, the transfer completion response is sent back to the client 1 immediately and the transfer data received is stored in the sever buffer 28.

Figure 4:
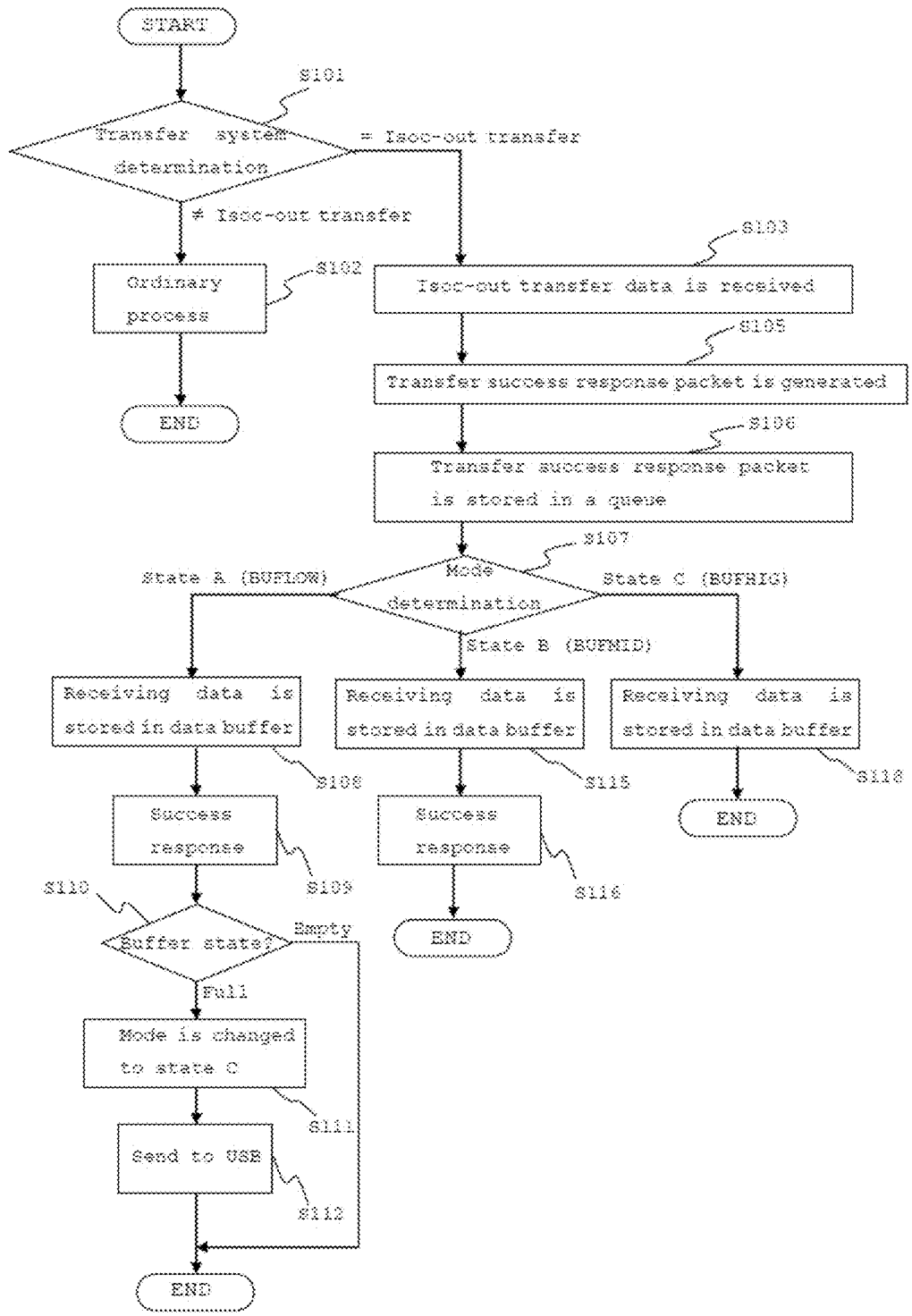
FIG. 4 An operation flow chart (1) of a device server according to embodiment 1
Figure 5:
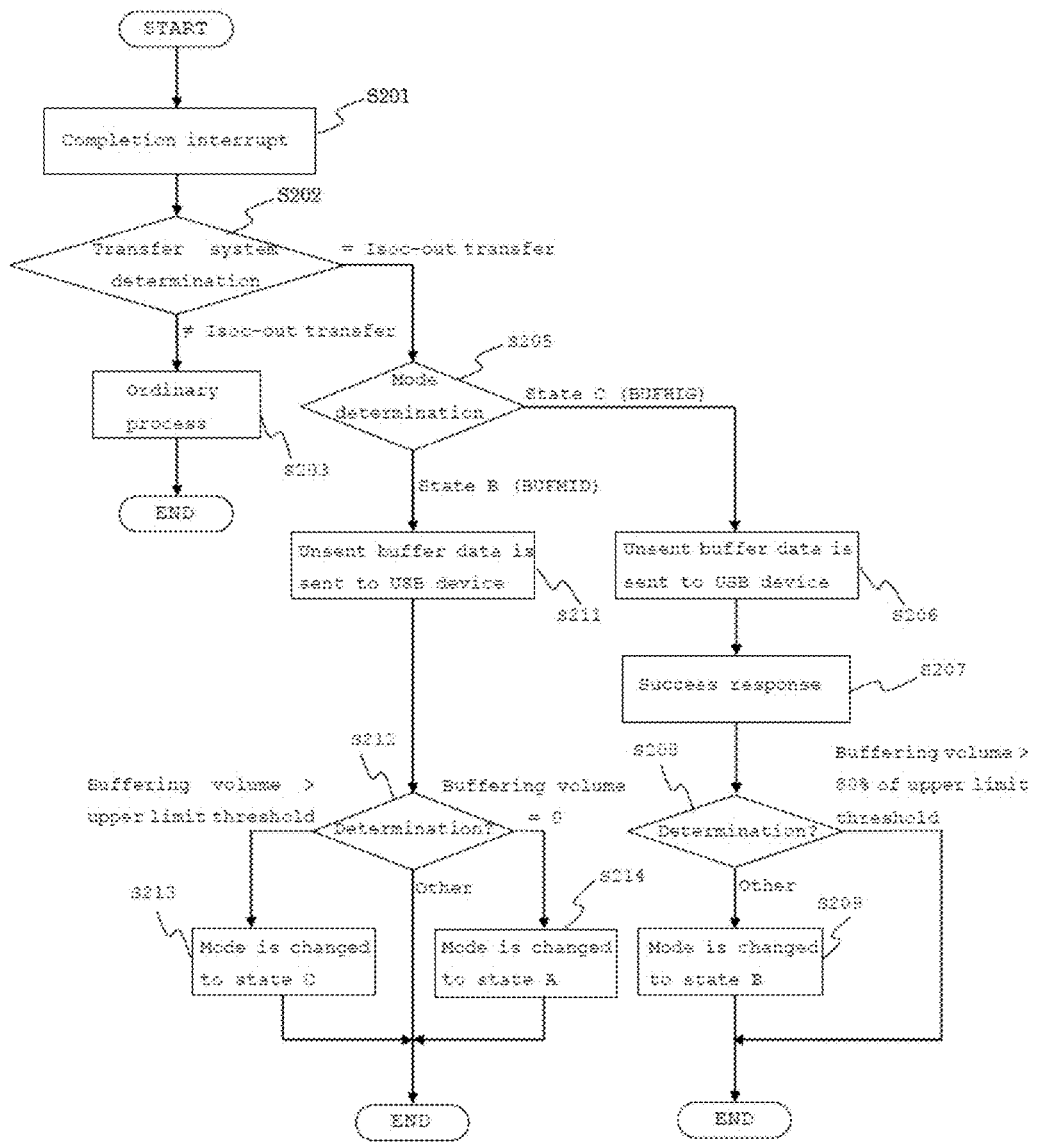
FIG. 5 An operation flow chart (2) of a device server according to embodiment 1

The buffering operation flow of the device server 2 according to Embodiment 1 is divided to two cases, one is a process performed by receiving isochronous output transfer request from the client 1 and the other is a process performed by interrupting handling of transfer data transmission completion to the speaker 3 (a USB device). The former receiving process generates a transition from the state A (BUFLOW) to the state C (BUFHIG) and the latter interruption process generates other transitions. The operation flow of the former receiving process is shown in FIG. 4 and the operation flow of the latter interruption process is shown in FIG. 5. The data buffer corresponds to the sever buffer 28 in the explanation hereafter.

Firstly, an operation flow of receiving process is explained by referencing FIG. 4. As was explained above, the transition from state A (BUFLOW) to state C (BUFHIG) occurs in the receiving process. In the receiving process, the transfer mode of the transfer request sent from the client 1 (S101) is determined. Ordinary process (S102) is performed acceding to the transfer request (bulk transfer, for example)

if the transfer mode is other than the isochronous output transfer mode. If the transfer system is the isochronous output transfer request, the isochronous output transfer data is received (S103).

In the receiving process, a transfer success response packet is generated (S105) and stored in a queue (S106) to send back a transfer completion response to the client 1 after receiving the isochronous output transfer request from the client 1. The queue mentioned here is a waiting line of a transfer success response packet and the transfer success response packet stored is sent back to the client 1 sequentially according to a flow to be mentioned below.

And in the receiving process, the mode of the device server 2 is determined (S107). If the current mode turns out to be the state A (BUFLOW) as a result of the mode determination, the receiving data is stored in the data buffer (S108) and, at the same time, the transfer success response packet is sent back to the client 1 (S109). After that, the status of the data buffer storing the transfer data is determined (S110).

If the retention data volume in the data buffer is full (has reached to the upper limit threshold), data stored in the data buffer is sent to the speaker 3 (a USB device), by the isochronous output transfer (S112) after changing the mode from the state A (BUFLOW) to the state C (BUFHIG) (S111).

On the other hand, if the current mode turns out to be the state B (BUFMID) as a result of mode determination (S107), the data received is stored in the data buffer (S115) and the transfer success response packet is sent back to the client 1 (S116). Also, if the current mode turns out to be the state C (BUFHIG) as a result of mode determination, only the data received is stored in the data buffer (S118) and the transfer success response packet is not sent back to the client 1.

Next, an operation flow of an interrupt handling is explained by referencing FIG. 5. As was explained above, the transitions other than the one from the state A (BUFLOW) to the state C (BUFHIG) are generated. Because the interrupt handling operates by the completion interrupt (S201) of the isochronous output transfer to the speaker 3 (a USB device), for example, completion interrupts of 10 times per second occur and the interrupt handling is started at 10 times per second, if the isochronous output transfer is conducted every 100 milliseconds.

In the interrupt handling process, the transfer mode (S202) is determined, and if the transfer mode is other than the isochronous output transfer request, then an ordinary processing corresponding to the transfer request (S203).

And in the interrupt handling, the mode (status) of the device server 2 (S205) is determined. When the current mode turns to be the status C (BUFHIG) as a result of mode determination, the unsent buffer data in the data buffer that stores the transfer data is sent to the speaker 3, (a USB device), by the isochronous output transfer (S206) and if the response packet data is stored in the queue, a transfer success response is sent back to the client 1 and if the response packet data is not stored in the queue, a transfer success response is not sent back to the client 1 (S207).

After that, the status of the data buffer is determined (S208). If the determination result shows that the retention data volume (the buffering volume) in the data buffer is lower than 80% of the upper limit threshold (the intermediate threshold), the mode is changed from the state C (BUFHIG) to the state B (BUFMID) (S209).

On one hand, if the current mode is the state B (BUFMID) as a result of mode determination (S205), the unsent buffer data in the data buffer that stores the transfer data is sent to the speaker 3 (a USB device), by the isochronous output transfer (S211). After that, the status of the data buffer is determined (S212). If the determination shows that the retention data volume (the buffering volume) in the data buffer exceeds the upper limit threshold, the mode is changed from the state B (BUFMID) to the state C (BUFHIG) (S213). On the other hand, if the determination shows that the retention data volume (the buffering volume) is equal to zero, the state B (BUFMID) is changed to the state A (BUFLOW) (S214). Note that if the determination shows that the retention data volume (the buffering volume) neither exceeds the upper limit threshold nor equals to 0 (zero), the mode is not changed.

Below, the sequence of the device server system using the device server is explained.

Figure 9:
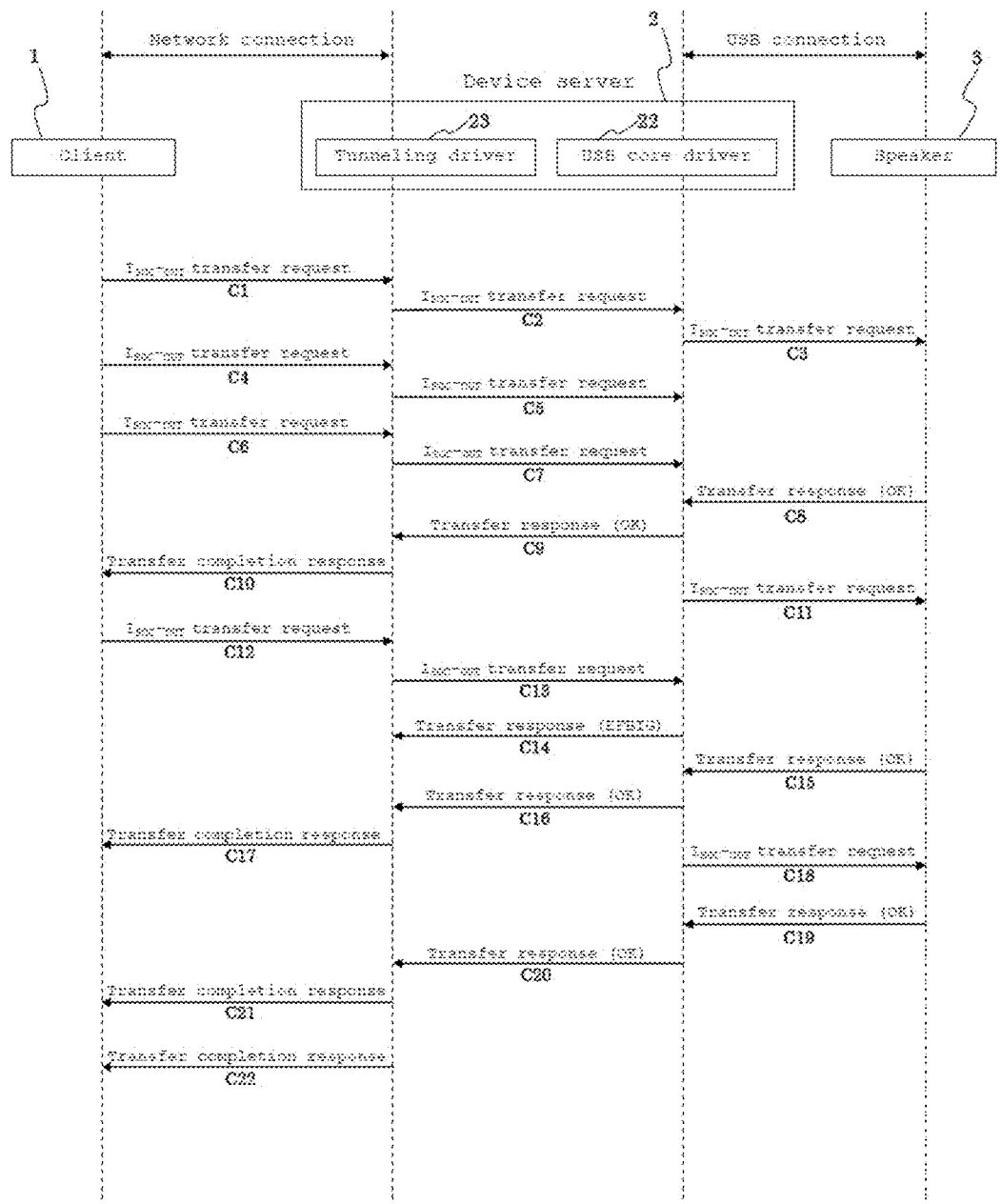
FIG. 9 A sequence diagram of the isochronous output transfer data of the conventional device server

First, FIG. 9 shows the isochronous output transfer data sequence of the conventional server. FIG. 9 shows the data sequence for the case in which the isochronous output transfer request is sent out from the client 1 under the circumstance where the client 1 is connected to the device sever 2 via the network 4 and the device 2 and the speaker 3 (a USB device), are USB connected. The isochronous output transfer request ($I_{SOC-OUT}$ Transfer request C1) is sent out from the client 1, in the first place, which the tunneling driver 23 recognizes and sends out the isochronous output transfer request ($I_{SOC-OUT}$ transfer request C2) to the USB core driver 22. The USB core driver 22 sends out the isochronous output transfer request ($I_{SOC-OUT}$ transfer request C3) in a unit of URB to the speaker 3. When the isochronous output request is successfully completed (C8), a transfer response (OK) C9 is sent out from the USB core driver 22 and the transfer completion response C10 is sent to the client 1 by the tunneling driver 23.

As has been explained above, in the case of the isochronous output transfer of the conventional device server, the audio data is transferred by the isochronous output transfer request ($I_{SOC-OUT}$ transfer request) from the client and the device server performs de-capsulation on the IP packet data using the tunneling driver and sends to the USB core driver as it is, after converting into the USB conformable data. The USB core driver performs the data transfer to the speaker by the isochronous output transfer request (the $I_{SOC-OUT}$ transfer request) in harmony with a predetermined interval.

If audio data of the isochronous output transfer request (the $I_{SOC-OUT}$ transfer request) transmitted from the client is oversized to be mounted to a queue in the USB core driver (C13), the USB core driver sends back (C14) an error code (EFBIG).

For example, there is a case in which a large amount of data is transferred due to output of the multiple isochronous transfer requests at a time from the client 1 (C1, C4, C6) when the link has been cut and then has been restored at a network level. In this case, following the isochronous output transfer request from the client 1, the next isochronous output transfer request is sent out and, in response to this, the tunneling driver 23 in the device server 2 conducts the isochronous output transfer request to the USB core driver 22 (C13). However, a phenomenon in which the isochronous transfer cannot be scheduled arises and an error is transferred back from the USB driver 22 as a transfer response (C14).

Namely, in the conventional device server, when the too large number of isochronous output transfer request is issued to be scheduled by the scheduler in the USB core driver 22, the USB core driver 22 sends back an error response and the client 1 cuts off the transfer session with the device server 2 upon receiving the error.

Next, an example of the isochronous output transfer in the conventional device server, there are shown in Table 2 below, changes in (i) the input data volume on the client side, (ii) the buffer volume on the client side, (iii) the network data volume and (iv) the output volume toward the USB device side with elapse of time. Table 2 shows that the client side input data volume of 10 at every 10 ms is generated and drained to the network every time the input data is generated. Accordingly, the input data volume on the client side and the network data volume stays equal during ordinary time (0~30 ms, 90~110 ms). And, the buffer volume on the client side remains 0 because any data is not buffered in the client buffer during ordinary time. Also, the output volume to the USB devise side equals the data volume flowing through the network. A data volume of 10 is output to the USB device side at a predetermined transfer rate.

However, during the time when the network becomes unstable (40~60 ms), the network data volume decreases or becomes 0 (zero), instead, the transfer data is stored in the buffer on the client side, and the buffer volume on the client side increases. Due to the situation where the network data volume decreases or becomes 0 (zero), the output volume toward the USB device side also decreases or becomes 0 (zero), because the data volume in the network straightly becomes the output volume. When the network recovers (70 ms), the data buffered in the buffer on the client side flows through the network.

Table 2 shows that during a time zone (50~60 ms) when the network becomes unstable, the output volume toward the USB devise side becomes 0 (zero) and the lack of data occurs.

TABLE 2

| Elapsed time | Input data volume on client side | Buffer volume on client side | Network data volume | Output volume toward USB devise side |
|---|---|---|---|---|
| 0 | 10 | 0 | 10 | 10 |
| 10 | 10 | 0 | 10 | 10 |
| 20 | 10 | 0 | 10 | 10 |
| 30 | 10 | 0 | 10 | 10 |
| 40 | 10 | 5 | 5 | 5 |
| 50 | 10 | 15 | 0 | 0 |
| 60 | 10 | 25 | 0 | 0 |
| 70 | 10 | 10 | 25 | 10 |
| 80 | 10 | 0 | 20 | 10 |
| 90 | 10 | 0 | 10 | 10 |
| 100 | 10 | 0 | 10 | 10 |
| 110 | 10 | 0 | 10 | 10 |
| Total | 120 | | 120 | 95 |

Figure 6:
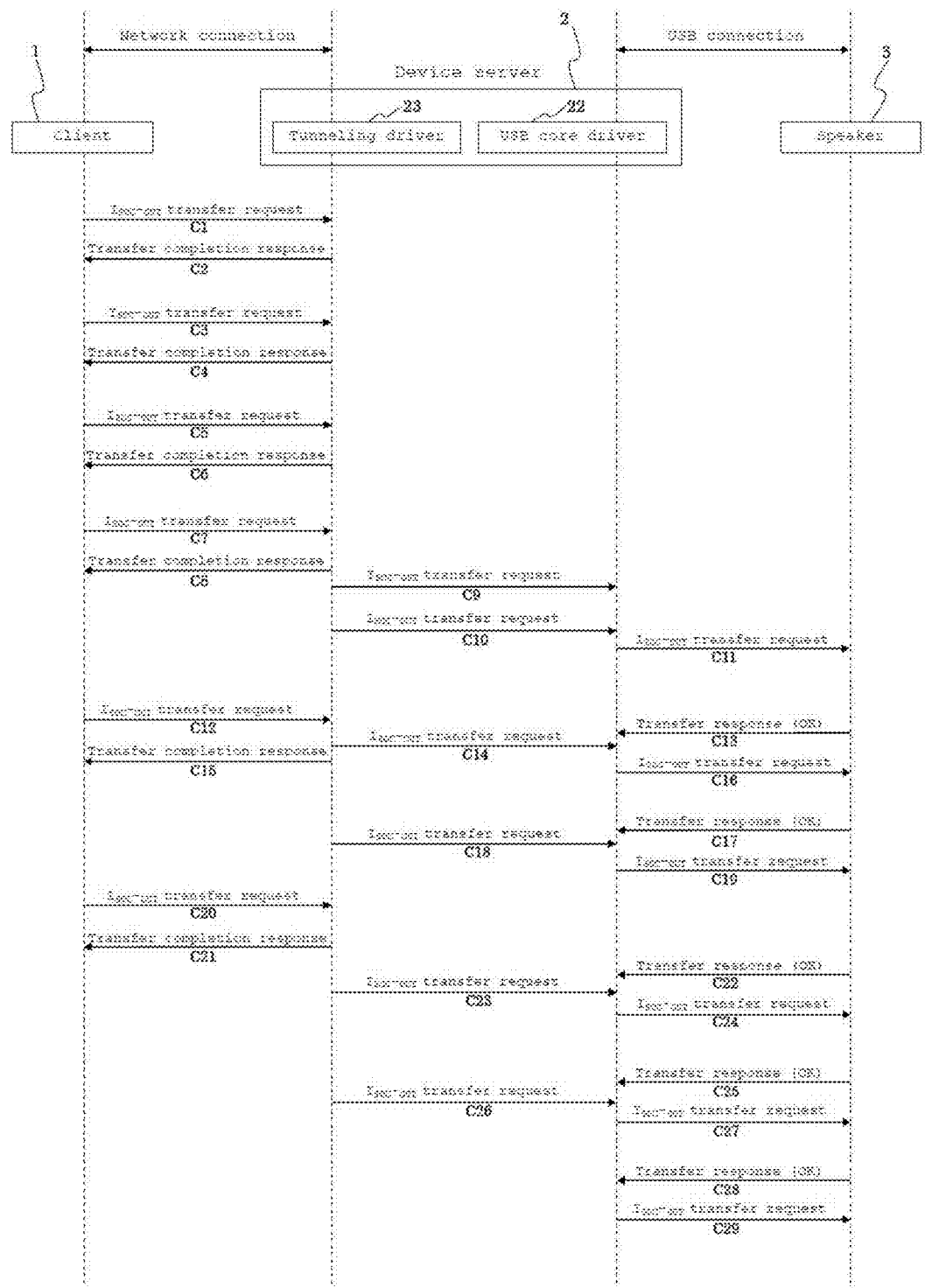
FIG. 6 A sequence diagram of an isochronous output transfer data for a device server according to embodiment 1

The present invention solves above mentioned problems. FIG. 6 shows the isochronous output transfer data sequence of the device server 2 according to Embodiment 1. In the isochronous output transfer data sequence of the device server 2 according to Embodiment 1, unlike the conventional isochronous output transfer data sequence mentioned above (FIG. 9), the device server 2 sends back a transfer completion response to the client 1 immediately (C1~C8) upon receiving the isochronous output transfer request ($I_{SOC\text{-}OUT}$ Transfer request) from the client 1, if there is a vacancy in the buffer of the device server 2.

In a certain OS (Operating System) of the client 1, according to the timing that the response to the foregoing request returns, the next isochronous output transfer request is sent out under the isochronous output transfer protocol, that is to say the advance reading of the isochronous output transfer data can be performed on the side of the device server 2.

Note that there is another kind of OS which, even when a response comes back by the isochronous output transfer protocol, ignores the response and constantly sends out the next request within a prescribed time.

The device server 2 withholds output of the transfer data to the USB core driver 22 until the buffer of the device server 2 reaches the upper limit threshold. And the device server 2 outputs transfer data of around 100 ms to the USB core driver 22 at the timing when buffer reaches the upper limit threshold (C9 and C10). Afterwards, the device server 2 outputs transfer data to the USB core driver 22 (C14, C18, C23 and C26) at the interrupt handling (a processing of a transfer completion interrupt handler) of the device server 2 activated by a transfer response (C13, C17, C22 and C25) from the speaker 3 (USB device).

When the server buffer 28 of the device server 2 reaches the upper limit threshold, the device server 2 changes its state to case (1) and starts a data output transfer to the USB device, and at the same time, the device server 2 can also delay a timing for sending back a response to the client 1. This is because the server buffer 28 of the device server 2 can be controlled not to overflow by delaying the timing of the response return, as, in a certain OS, the next request is sent out depending on the timing that the response to the foregoing request returns under the isochronous output transfer protocol as mentioned above.

TABLE 3

| Elapsed time | Input data volume on client side | Buffer volume on client side | Network data volume | Buffer volume on device server side | Output volume toward USB devise side |
|---|---|---|---|---|---|
| 0 | 10 | 0 | 10 | 10 | 0 |
| 10 | 10 | 0 | 10 | 20 | 0 |
| 20 | 10 | 0 | 10 | 30 | 0 |
| 30 | 10 | 0 | 10 | 40 | 0 |
| 40 | 10 | 5 | 5 | 35 | 10 |
| 50 | 10 | 15 | 0 | 25 | 10 |
| 60 | 10 | 25 | 0 | 15 | 10 |
| 70 | 10 | 10 | 25 | 30 | 10 |
| 80 | 10 | 0 | 20 | 40 | 10 |
| 90 | 10 | 0 | 10 | 40 | 10 |
| 100 | 10 | 0 | 10 | 40 | 10 |
| 110 | 10 | 0 | 10 | 40 | 10 |
| Total | 120 | | 120 | | 80 |

As an example of the isochronous transfer of the device server 2 according to Embodiment 1, the input data volume on the client 1 side, the buffer (corresponding to the client buffer 18) volume on the client 1 side, the network data volume, the device server 2 side buffer (corresponding to the server buffer 28) and the output volume change on the USB device side are listed with elapse of time on Table 3 above.

Table 3 shows that, as was the case in Table 2, the client side input data volume of 10 is generated at every 10 ms and drained to the network every time the input data is generated. Accordingly, in the same manner as in Table 2, the input data volume on the client side and the network data volume stays equal during ordinary times (0~30 ms, 90~110 ms). However, different from the manner shown in Table 2, the input data is stored in the side of the buffer of the device server 2 without outputting the input data to the USB device side. Therefore, the buffer volume on the device server 2 side increases to 40 at 30 ms elapse of time. If the upper maximum threshold of buffer on the side of the 2 is 40, for the reason that the buffer volume has reached to the upper limit threshold, data output to the side of USB device at predetermined transfer rate (10 in this case) is started after the time elapse of 40 ms.

And in the time zone (40~60 ms) wherein the network becomes unstable, the network data volume decreases or becomes 0 (zero) and the transfer data is stored in the buffer on the side of the client 1 and the buffer volume on the side of the client 1 increase as was the case in Table 2. However, the output volume toward the USB device side is maintained continuously at 10, different from the case in Table 2, because the device server 2 outputs the retention data in the buffer to the USB device side even when the network data volume decreases or becomes 0 (zero).

As is shown in Table 3, the data output volume toward the USB device side can be continuously kept at a constant value (10 in this case) after the time elapse of 40 ms. Thus, it is understood that the data transfer volume to be guaranteed by the isochronous transfer can be maintained in the case of Embodiment 1, even in a circumstance that scheduling of the isochronous transfer becomes impossible due to network congestion.

Figure 7:
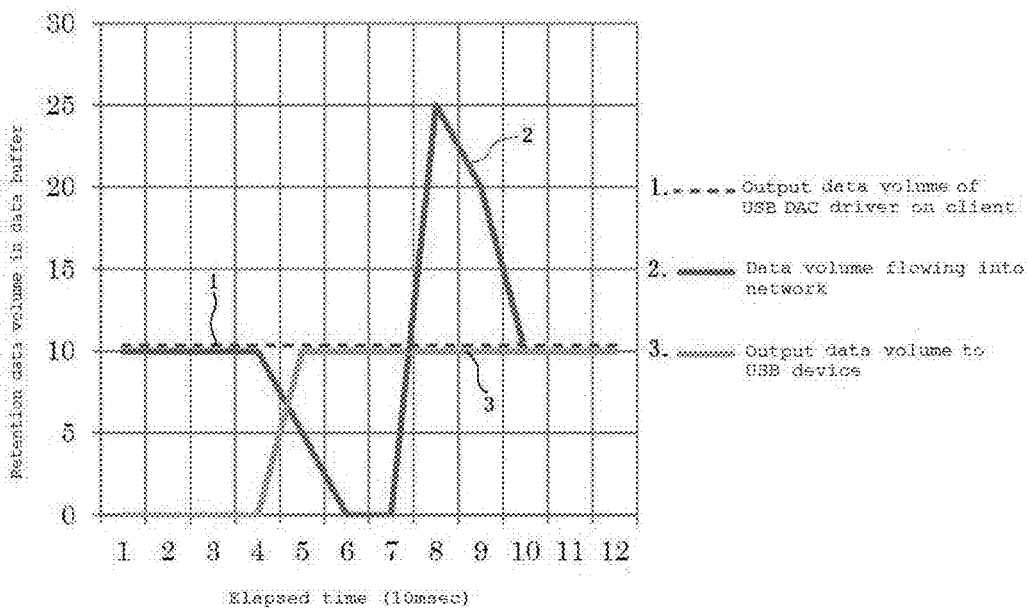
FIG. 7 An explanatory drawing of data volume in a device server according to embodiment 1
Figure 8:
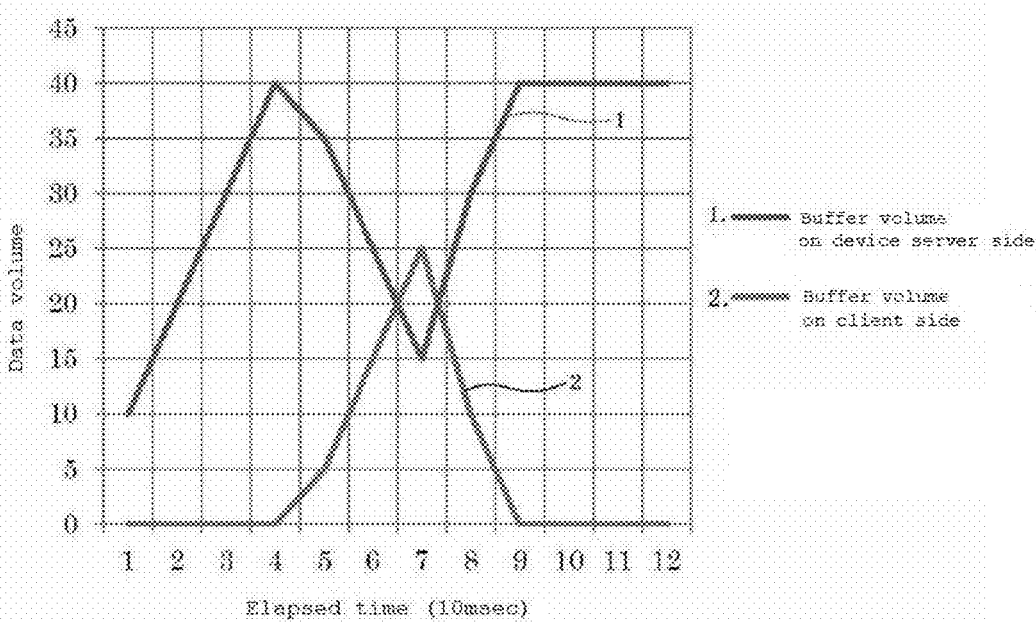
FIG. 8 An explanatory drawing of retention data volume in each data buffer for a client and a device server according to embodiment 1

FIG. 7 explains the data volume at the device server system according to Embodiment 1 and FIG. 8 explains the retention data volume in the client 1 and the device server 2.

FIG. 7 shows how the output volume of the USB DAC driver 12 on the client 1 (input data volume of the tunneling driver 13 on the client), the data volume flowing into the network and the data volume output to the USB device change by the delay.

The unit of horizontal axis is 10 ms and the vertical axis represents the data volume in FIG. 7. The example in FIG. 7 shows the occurrence of a data flow delay and stagnated data flow in the network at between 40 ms and 60 ms.

Data transfer to the USB device is started after data accumulation of a certain volume (after data accumulation of a volume transferable within 40 ms), which means transfer data with a volume transferable within 40 ms flows all at once into the network at 80 ms.

However, the output volume to USB device is kept at a constant value by the existence of the buffer of the device server.

FIG. 8 shows the data volume in the buffers on the side of the client 1 and on the side of the device server 2 when a data delay within the network occurs as is shown in FIG. 7. The horizontal axis unit is 10 ms and the vertical axis is data volume in FIG. 8. The network is recovered before buffered data on the side of the device server 2 runs out and then the buffered data on the side of the client 1 is released instantly (refer to 70~80 ms in FIG. 8). In case of the device server 2 according to Embodiment 1, it is possible to take in the data flowing out from the client 1 into the buffer on the side of the device server 2 and perform the data transfer to USB device at a constant transfer rate.

It should be noted that a device server system where a client uses a speaker as a USC device via a network is explained as an example in the above mentioned Embodiment, however, the scope of the present invention is not limited in this respect, a transmission method equivalent to USB standard transmission, for example, conformable to other interface such as IEEE1394 may be used.

INDUSTRIAL APPLICABILITY

The present invention is particularly useful to a device system that enhances usability of peripherals such as a USB device.

DESCRIPTION OF SYMBOLS

1 Client
2 Device server
3 Speaker
4 Wireless network
5 USB connection cable

What is claimed is:

1. A device server, capable of being connected to a client via a network and also being connected locally to a device for performing isochronous transfer, said device server comprising: a data buffer portion for buffering transfer data upon receiving an isochronous output transfer request from said client; and at least one driver; and wherein said device server changes operation of said at least one driver according to at least the following cases (1) to (3):

(1) in a range of time starting from a state wherein the retention data volume of the data buffer portion reaches an upper limit threshold to a state wherein the retention data volume becomes lower than an intermediate threshold,
an isochronous output transfer to said device at a predetermined transfer rate is performed and when the isochronous output transfer is completed, if there is a request a response thereto is not sent back to said client, upon receiving an isochronous output transfer request from said client, a transfer completion response is sent back to said client and the transfer data received is accumulated in said data buffer portion;

(2) in a range of time starting from a state wherein the retention data volume of the data buffer portion is lower than the intermediate threshold to a state wherein the retention data volume reaches the upper limit threshold or reaches the lower limit threshold,
an isochronous output transfer to said device at a predetermined transfer rate is performed and unconditionally sending back a transfer completion response to said client upon receiving an isochronous output transfer request from said client and the transfer data received is accumulated in said data buffer portion;

(3) in a range of time starting from a state wherein the retention data volume of said data buffer portion reaches the lower limit threshold to a state wherein the retention data volume reaches the upper limit threshold,
without performing an isochronous output transfer to said device and unconditionally sending back the transfer completion response to said client upon receiving an isochronous output transfer request from said client and the transfer data received is accumulated in said data buffer portion.

2. The device server according to claim 1, wherein said upper limit threshold equals a value of the buffer size of said data buffer portion multiplied by a coefficient of less than 1, said intermediate threshold equals a value in the range from 10% to 90% of said upper limit threshold and said lower limit threshold equals a value smaller than said intermediate threshold.

3. The device server according to claim 1, wherein the timing for performing a data transfer of said transfer completion response to said client is delayed to prevent overflow of said data buffer, in a range of time starting from a state wherein the retention data volume of the data buffer portion reaches an upper limit threshold to a state wherein the retention data volume becomes lower than an intermediate threshold.

4. The device server according to claim 1, wherein an isochronous output transfer to said device is performed after processing the audio data row which is a retention data remaining in said data buffer portion to make the output sound from the audio device fade out, in a case where the retention data volume in the said data buffer portion becomes lower than a mute setting threshold and in a range of time starting from a state wherein the retention data volume of said data buffer portion becomes lower than the intermediate threshold to a state wherein the retention data volume reaches the lower limit threshold.

5. The device server according to claim 1, wherein said lower limit threshold equals a value of 0 (zero).

6. The device server according to claim 1, wherein said intermediate threshold is set at a value in the range from 60 to 80% of the upper limit threshold.

7. A method for controlling a device server, said device server being connected to a client via a network, and also being connected locally to a device for performing an isochronous transfer, said device server further being equipped with a data buffer portion for buffering a transfer data requested upon receiving an isochronous output transfer request from the client, said method comprising: a transfer request receiving step; a transfer data retention step; and an output transfer step; wherein, (1) in a range of time starting from a state wherein the retention data volume of the data buffer portion reaches an upper limit threshold to a state wherein the retention data volume becomes lower than an intermediate threshold;

at said transfer request receiving step, a transfer completion response is sent back to said client upon receiving an isochronous output transfer request from said client and when there is a request a response thereto is not sent back to said client;

at said transfer data retention step, a transfer data received is stored in a buffer portion; and at said output transfer step, an isochronous output transfer to said device at a predetermined transfer rate is performed;

(2) in a range of time starting from a state wherein the retention data volume of the data buffer portion is lower than the intermediate threshold to a state wherein the retention data volume reaches the upper limit threshold or reaches the lower limit threshold;

at said transfer request receiving step, a transfer completion response is unconditionally sent back to said client upon receiving the isochronous output transfer request from said client;

at said transfer data retention step, a transfer data received is stored in buffer portion and at said output transfer step, an isochronous output transfer to said device at a predetermined transfer rate is performed;

(3) in a range of time starting from a state wherein the retention data volume of said data buffer portion reaches the lower limit threshold to a state wherein the retention data volume reaches the upper limit threshold;

at said transfer request receiving step, a transfer completion response is unconditionally sent back to said client upon receiving an isochronous output transfer request from said client;

at said transfer data retention step, a transfer data received is stored in a buffer portion; and at said output transfer step, an isochronous output transfer to said device is not performed.

8. The method for controlling the device server according to claim 7, wherein said upper limit threshold is a value multiplying the buffer size of said data buffer portion by a coefficient of less than 1, and said intermediate threshold is a value in the range from 10% to 90% of said upper limit threshold said lower limit threshold is a value smaller than said intermediate threshold.

9. The method for controlling the device server according to claim 7, wherein, in a range of time starting from a state wherein the retention data volume of said data buffer portion reaches an upper limit threshold to a state wherein a retention data volume reaches an intermediate threshold, the method further comprises a step for delaying the timing of transferring said transfer completion response to said client in order to avoid overflow of said data buffer.

10. The method for controlling the device server according to claim 7, wherein said device is an audio device, and in a range of time starting from a state wherein the retention data volume of said data buffer portion becomes lower than the intermediate threshold to a state wherein the retention data volume reaches the lower limit threshold, at said output transfer step, said isochronous output transfer to said device is performed after processing the audio data row which is a retention data remaining in said data buffer portion to make the output sound from the audio device fade out.

11. The method for controlling the device server according to claim 7, wherein said upper limit threshold is a value multiplying the buffer size of said data buffer portion by a coefficient of less than 1, and said intermediate threshold is a value in the range from 60% to 80% of said upper limit threshold.

12. The method for controlling the device server according to claim 7, wherein said lower limit threshold is 0 (zero).

13. The method for controlling the device server according to claim 7, further comprising processing audio data in said data buffer portion to make output sound from an audio device fade out.

* * * * *